United States Patent [19] … [11] 4,146,969
Chaires … [45] Apr. 3, 1979

[54] SURVEYOR'S ROD

[76] Inventor: George O. Chaires, P.O. Box 5175, Tallahassee, Fla. 32301

[21] Appl. No.: 849,364

[22] Filed: Nov. 7, 1977

[51] Int. Cl.² ............................................. G01C 15/08
[52] U.S. Cl. ...................................... 33/295; 248/518; 248/530; 294/51
[58] Field of Search ...................... 33/275 R, 293, 294, 33/295, 296; 172/247, 254, 372, 375; 294/51; 248/156, 518, 530, 532, 533

[56] References Cited

U.S. PATENT DOCUMENTS

| | | | |
|---|---|---|---|
| 154,018 | 8/1874 | Cassiano | 294/51 |
| 293,992 | 2/1884 | Wall | 172/372 |
| 368,013 | 8/1887 | Schad | 294/51 |
| 1,976,264 | 10/1934 | Miner et al. | 33/293 |
| 2,218,418 | 10/1940 | Cain et al. | 33/295 |
| 2,245,901 | 6/1941 | Chaskin | 33/295 |

FOREIGN PATENT DOCUMENTS 1172460  6/1964  Fed. Rep. of Germany ............ 294/51
150841   7/1955  Sweden .................................... 33/293

*Primary Examiner*—Richard R. Stearns
*Attorney, Agent, or Firm*—Dowell & Dowell

[57] ABSTRACT

A surveyor's rod apparatus including a plurality of sections which may be selectively connected together in end-to-end relationship to provide an elongated surveyor's rod that is visible over relatively long distances regardless of obstructions including vegetation and terrain between the rod and a sighting or surveying instrument. At least one section of the rod includes a leveling device to make certain that the rod is disposed along a vertical axis in the plane of the sighting instrument. The lower section of the rod is selectively connected to a base in a manner such that the base may be used for providing a flat area on which the base is subsequently located, or the lower section of the rod may be connected to the base in a manner that the base may be driven into the ground at a fixed location.

5 Claims, 11 Drawing Figures

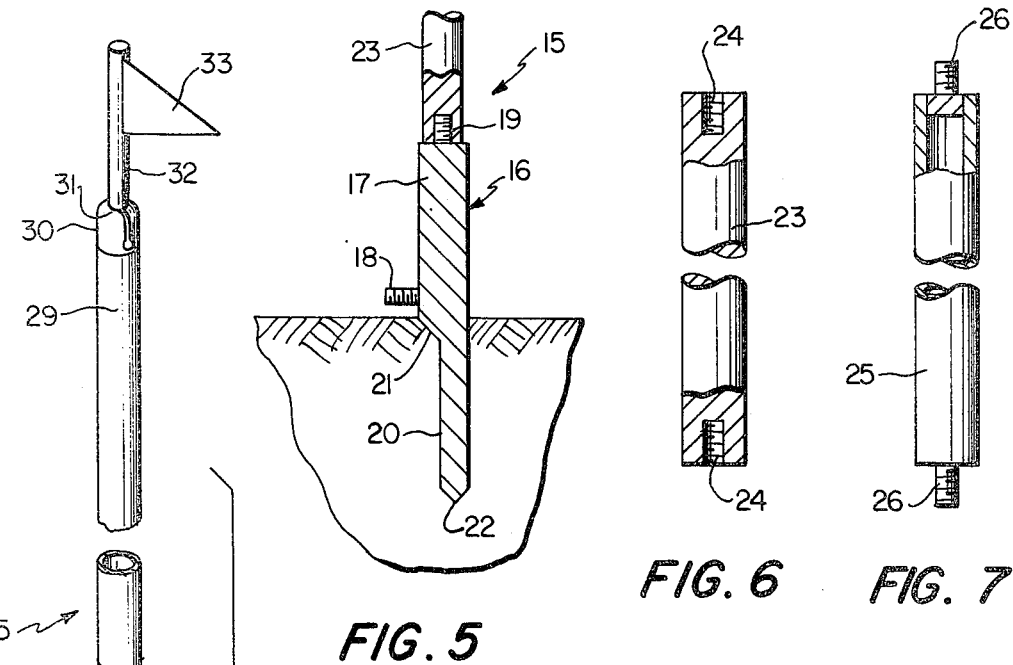
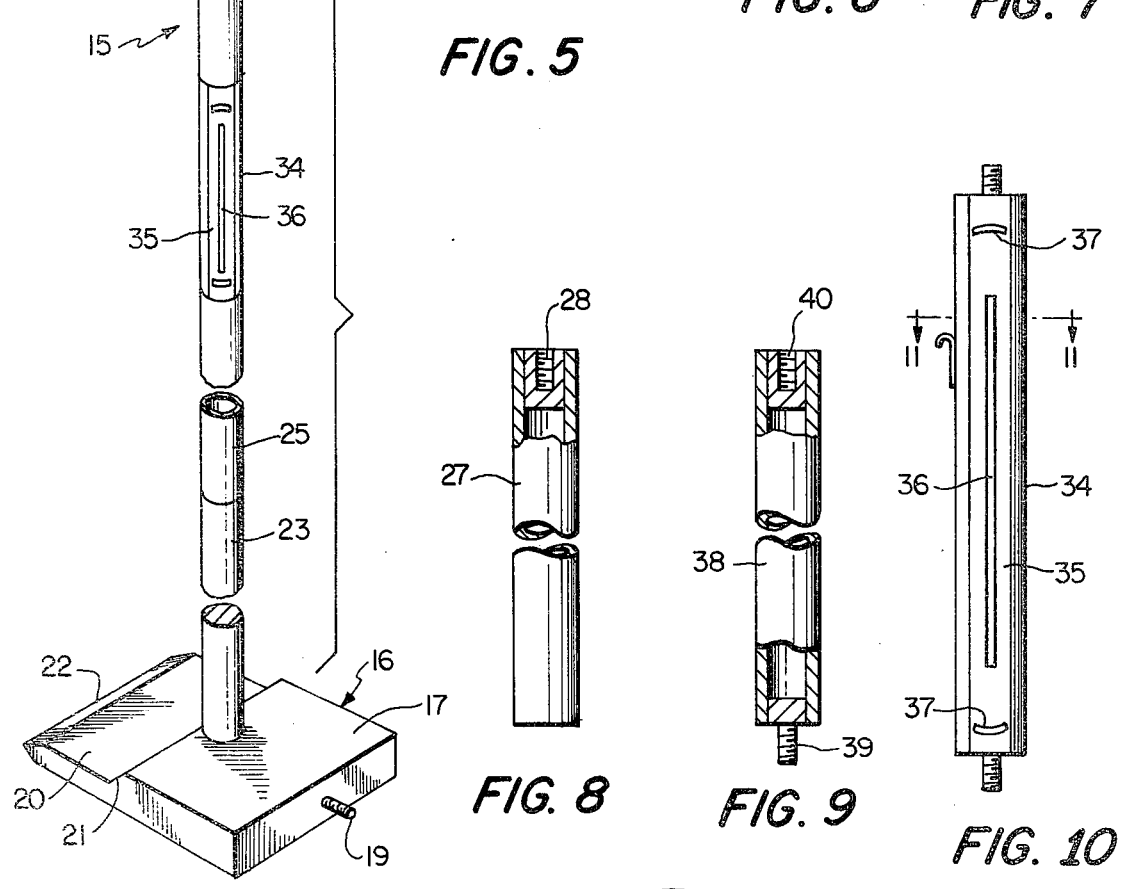

SURVEYOR'S ROD

BACKGROUND OF THE INVENTION

1. Field of the Invention

This invention relates generally to measuring instruments of various kinds and relates specifically to a surveyor's rod used with a transit or other sighting instrument.

2. Description of the Prior Art

Heretofore many efforts have been made to provide surveying rods for use with a transit or other sighting instrument, and most of these rods normally have a height of approximately six to eight feet. Such rods have been provided with indicia representing known units of length. Most surveyor's rods are used by clearing a path or line of sight between the rod and the sighting instrument, and such clearing of the path has required a substantial amount of labor as well as a substantial amount of time.

Some efforts have been made to provide a surveyor's rod having extendable or telescoping sections and having a target or flag at the upper end to assist in taking a sight. Normally, these prior art structures have been complicated and have been limited as to the height which is attainable. Some examples of these prior art structures are shown by the patents to De La Pena U.S. Pat. No. 952,275; Watson U.S. Pat. No. 1,165,820; Chaskin U.S. Pat. No. 2,245,901; Heater U.S. Pat. No. 3,762,058; and British Pat. No. 860,117.

SUMMARY OF THE INVENTION

The present invention is embodied in a surveyor's rod having a plurality of lightweight, easily portable sections which can be selectively connected together in end-to-end relationship so that the upper end of the rod is disposed at a substantial elevation which may be seen for long distances even though obstructions may be disposed between the rod and the sighting instrument. The lower section of the rod is selectively attached to one of two positions on a base. In the first position, the lower section is attached to the front face of the base so that the base can be used in a manner similar to a hoe to level the earth in the area where the rod is to be located. In the second position, the lower section of the rod is attached to the end wall of the base so that the base can be used in a manner similar to a shovel to remove portions of the earth, or the end of the base remote from the lower section may be forced into the earth so that the rod is located in fixed position. As many sections as desired may be provided with each of the sections normally being approximately five feet in length and usually approximately seven sections will be provided so that the top of the surveyor's rod can be located at least 35 feet above the ground. At least one of the sections is provided with one or more leveling devices which are arranged in a manner such that the surveyor's rod will be vertically disposed at least in the plane of a line of sight from the sighting instrument. When the surveyor's rod is fully extended, the flag or other target at the upper end is visible for long distances including above trees, underbrush, houses and the like, or if desired the surveyor's rod may be located in the central portion of a body of water, such as a lake or the like, with the flag being disposed above the surface.

It is an object of the invention to provide an extendable surveyor's rod including a plurality of independent sections which may be joined together in end-to-end relationship so that the upper end of the rod is visible for long distances regardless of the obstructions between the rod and the sighting instrument.

Another object of the invention is to provide a surveyor's rod having a base which may be used to level the earth where the rod is to be placed or may be partially driven into the ground to form a firm foundation for the rod.

BRIEF DESCRIPTION OF THE DRAWINGS

FIG. 3 is a fragmentary perspective of the surveyor's rod per se with the base in a first position.

FIG. 5 is a section taken on the line 5—5 of FIG. 4.

FIG. 6 is a fragmentary side elevation of the lowermost section of the rod with portions broken away for clarity.

FIG. 7 is a fragmentary side elevation of a male section having threaded projections extending from each end.

FIG. 8 is a fragmentary side elevation of a female section having threaded recesses at each end.

FIG. 9 is a fragmentary side elevation of an adjustment extension section having portions broken away and including a male threaded projection at one end and a female threaded recess at the opposite end.

FIG. 10 is a side elevation of a leveling section.

FIG. 11 is an enlarged section on the line 11—11 of FIG. 10.

DESCRIPTION OF THE PREFERRED EMBODIMENT

Figure 4:
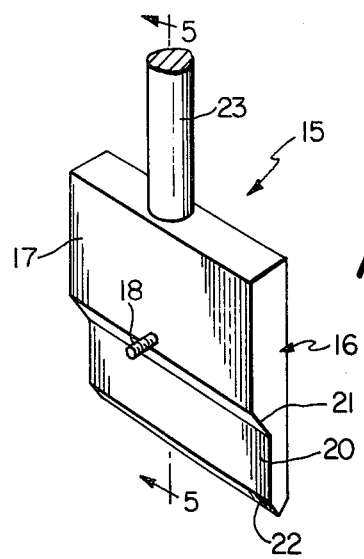
FIG. 4 is a perspective of the lower end of the rod with the base in an alternate position.
Figure 1:
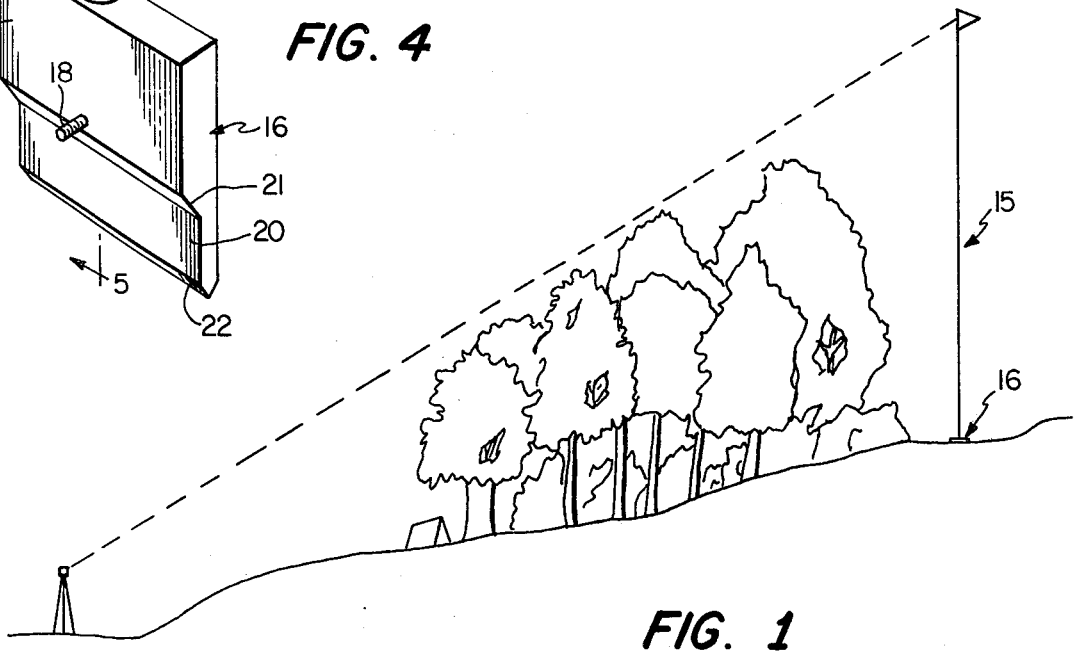
FIG. 1 is a side elevation illustrating the surveyor's rod in use on land and having the upper end disposed above trees and undergrowth.
Figure 2:
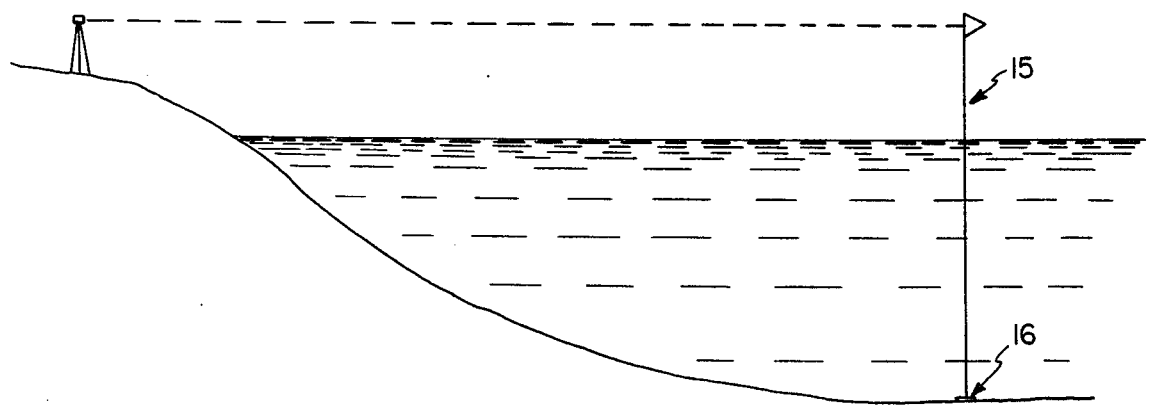
FIG. 2 is a side elevation illustrating the surveyor's rod used in a body of water.

With continued reference to the drawings, a surveyor's rod indicated generally at 15 is provided having an elongated generally rectangular base member 16 on which one or more rod sections are selectively mounted. The rear end portion 17 of the base member 16 is relatively thick and includes a first threaded projection 18 extending outwardly from the front wall, and a second threaded projection 19 extending outwardly from the trailing end. The front end portion 20 of the base member 16 is of reduced thickness relative to the rear end portion and is separated therefrom by a shoulder 21. Preferably, the leading end of the front end portion 20 has a sharpened edge 22 for a purpose which will be described later.

A lower rod section 23, which is of solid construction, is provided having a threaded recess 24 at each end which threadedly receives the projection 18 or 19. When the lower rod section 23 is connected to the first projection 18 of the base member, such base member can be used to scrape a level spot on the ground by using the same in a manner similar to a hoe. If desired the base member 16 may be used as a chopping tool to clear underbrush from the area to be leveled.

When the lower rod section 23 is connected to the second threaded projection 19, which is located along one end of the base, the base may be used either as a shovel for removing dirt, rocks and the like from the area to be leveled, or the rodman may place his foot on the edge of the base member and force the sharpened edge 22 into the ground so that the base forms a firm foundation for the rod.

After the lower rod section 23 has been selectively connected to the base member 16, a male rod section 25 having threaded projections 26 at each end is threadedly connected to the end of the lower rod section 23 remote from the base member. Thereafter a female rod section 27 having threaded recesses 28 at each end is threadedly attached in end-to-end relationship with the male rod section. Alternating male and female rod sections are then connected together in end-to-end relationship to form a string of rod sections until the string is at a desired height. The uppermost rod section 29 is provided with a split cap 30 having an opening 31 adapted to frictionally receive a post 32 on which a flag or other target 33 is mounted.

The male and female rod sections can be of any length and thickness; however, a length of approximately five feet and a diameter of approximately one to one and a half inches have been found satisfactory. Although the lower rod section 23 normally is of solid construction, the upper male and female rod sections generally are tubular and are provided with plugs at each end for the projections and recesses 26 and 28, respectively.

In order to cause the surveyor's rod to be level, at least in the plane of the line of sight of the surveying instrument, a leveling rod section 34 is provided having a flattened portion 35 extending axially thereof. The leveling rod section 34 includes a first bubble level 36 extending axially of such section along the flattened portion 35 and a pair of arcuate bubble levels 37 located adjacent opposite ends of such section which are disposed generally normal to the axis thereof. The leveling rod section 34 normally is from one to three feet long and can be inserted in any desired location along the length of the rod 15. If desired two or more leveling rod sections may be provided with one of the leveling rod sections being attached to the lower rod section 23 so that it is visible to the rodman holding the rod 15 in position. A second leveling rod section can be inserted at a higher elevation to give a more accurate indication of the vertical position of the rod 15. The upper leveling rod section 29 may be read by a member of the surveying crew from a ladder or the like adjacent to the rod.

When an obstruction between the sighting instrument and the rod is of a known height and it is desired to assemble only enough sections so that the flag or target 33 is visible, an adjustment rod section 38 is provided having a threaded projection 39 on one end and a threaded recess 40 at the opposite end so that the adjustment rod section can be interposed in the string regardless of whether the next lowermost section is a male rod section 25 or female rod section 27.

It is noted that as many rod sections as desired may be provided; however, enough rod sections are normally provided to extend the surveyor's rod 15 to a height of at least 35 feet.

When the rod 15 is to be located in a body of water, such as a lake, pond or the like, the surveying crew may propel a boat or the like to a desired location, after which the rod may be assembled and lowered into the water until the base 16 rests on the bottom of the lake. In assembling the surveyor's rod, the leveling rod section 34 is attached to the string of sections at a point where the bubble levels will be located above the waterline so as to be clearly visible by the members of the crew in the boat.

In the operation of the device, a surveying crew carries the rod sections to a location a substantial distance from the sighting instrument and at such location the lower rod section 23 is connected to a selected projection 18 or 19 on the base member 16. When the base member is to be used as a chopping tool or as a hoe for leveling the ground, the lower rod section is attached to the projection 18. During this leveling operation, the leveling rod section 34 of the rod may be placed lengthwise on the ground so that the bubble level 36 will indicate the degree of levelness of the earth. After the earth has been leveled, as many rod sections as required are attached in end-to-end relationship to the lower rod section 23 so that the flag 33 is visible to the people at the sighting instrument regardless of trees, undergrowth or rough terrian between the surveyor's rod and the sighting instrument.

I claim:

1. A selectively extendable surveyor's rod for use with a sighting instrument located in a remote position, comprising a generally rectangular base member having a generally flat first wall and a second wall disposed at an angle to said first wall, a first threaded projection extending outwardly from said first wall, a second threaded projection extending outwardly from said second wall, a rod including a plurality of rod sections, each of said rod sections having means at each end for connecting the same in end-to-end relationship with each other, at least one of said rod sections having a threaded recess at one end for selectively receiving said first and second threaded projections, and the uppermost section of said rod having flag means which is easily visible from a remote location, whereby a selected number of sections are connected together in end-to-end relationship so that said flag means extends above obstructions between the rod and the sighting instrument, and is visible from the sighting instrument.

2. The structure of claim 1 in which at least one of said rod sections includes a level indicator to facilitate positioning of the rod vertically.

3. The structure of claim 1 in which said base member includes a sharpened edge remote from said second wall to facilitate insertion into the ground.

4. The structure of claim 1 in which said base member includes first and second portions with said first portion located adjacent to said second wall being substantially thicker than said second portion.

5. The structure of claim 1 in which said one rod section is of solid construction and the other rod sections are of tubular construction.

* * * * *